May 15, 1951     T. R. GRIFFIN     2,552,779

ADJUSTABLE FASTENER STUD

Filed Jan. 28, 1947     2 Sheets-Sheet 1

Inventor

THEODORE R. GRIFFIN,

By John Todd

Attorney

May 15, 1951 — T. R. GRIFFIN — 2,552,779
ADJUSTABLE FASTENER STUD
Filed Jan. 28, 1947 — 2 Sheets-Sheet 2

Inventor
THEODORE R. GRIFFIN,
By John Todd
Attorney

Patented May 15, 1951

2,552,779

UNITED STATES PATENT OFFICE 2,552,779

ADJUSTABLE FASTENER STUD

Theodore R. Griffin, Lexington, Mass., assignor to United-Carr Fastener Corporation, Cambridge, Mass., a corporation of Massachusetts Application January 28, 1947, Serial No. 724,803

4 Claims. (Cl. 24—221)

The present invention relates to improvements in fastener studs, particularly those of the rotary operative type, which are designed upon partial rotation to engage and lock with a suitable fastener member attached to a support.

More particularly, the invention relates to improvements in the fastener studs of cowling fasteners such as are used for securing aircraft cowling sheets to supports.

The assembly of rotary stud fastener installations for modern high speed aircraft requires accurate selection of a stud of predetermined length to fit the sockets with which it is to be used in order to lock the cowling parts under the desired tension. Due to many variable factors encountered in manufacture, such as variations in thickness of cowling sheets, distortions and the like, approximately thirty (30) sizes of studs are provided ranging in length from 0.210 inch to 0.480 inch, such effective length being measured from the base of the head to the central axis of the cross-pins or radial arms.

In aircraft for use in military operations, replacement of the rotary studs of such rotary fastener installations is often required, and it is not advantageous to maintain such a large assortment of sizes of studs as above stated in the field repair stations.

Furthermore, in modern high speed aircraft, air pressure tending to separate the cowling plates is very great with the result that the stud member must be very strong to withstand such tension. As a safety factor such studs are at present tested to withstand a pull of 1000 lbs. before acceptance.

The present invention aims to improve rotary fastener studs of the type above described by the provision of adjustable inter-threaded, headed and fastener-engaging parts with means providing a positive lock for said parts in selected adjusted positions.

A further object of the invention is the provision of an adjustable fastener stud normally locked against variation in effective length, but which may be manually unlocked to permit adjustment by definite increments of length.

A further object of the invention is the provision of an improved fastener stud which will be of standard size and shape, simple in construction and of adequate strength to withstand the load tests imposed.

Other aims and objects of the invention will be apparent to those skilled in the art from a consideration of the accompanying drawings and annexed specification illustrating and describing one embodiment of the invention.

The fastener stud selected for illustration in the accompanying drawings is one of the type commonly employed in rotary operative types, such as cowling fasteners, though it will be understood that the invention is not restricted to such specific types of fastener studs.

One type of fastener stud commonly employed in cowling fasteners comprises a shank formed with a head at one end and a pair of radial arms adjacent the nose and adapted to engage and lock with a fastener part upon partial rotation of the stud. The radial arms are conveniently provided by a hardened steel cross or transverse pin pressed through the stud nose.

To allow for distortion and bending, as well as variations in thickness of the supporting and cowling sheets, it has been necessary to supply series of studs for each size of fastener. Such series of studs varies in length from the head end to the cross-pin so that the user may select the proper length of stud for the particular fastener installation with which it is to be used.

The present invention provides an adjustable length stud member suitable for use as a cowling fastener stud, which will conform to the size and shape of a standard fastener stud but which will be adjustable to fastener secured installations of various depths.

Figure 10:
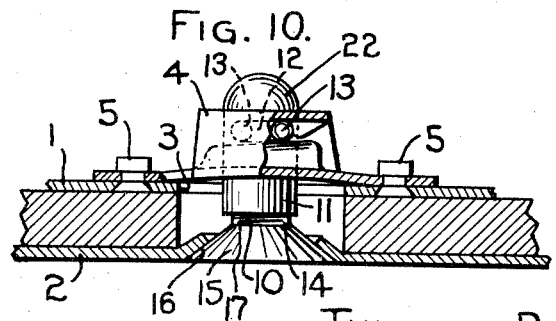
Fig. 10 is a vertical sectional view of a typical fastener secured installation to which the improved stud of the present invention is adapted.

One typical fastener secured installation for which the stud of the present invention is adapted, is illustrated in Fig. 10 and is one form of cowling fastener widely employed for securing together aircraft cowling sheets 1 and 2. The sheet 1 is commonly a supporting plate or part of an aircraft structure and is apertured as at 3 to receive the stud member rotatably mounted in the part to be supported, such as the cowling plate 2. A socket or female fastener member 4 is attached to an opposite face of a support 1, as by rivets 5, and has a raised cam seat adapted to be engaged by the radial arms of the stud upon partial rotation of the latter. The fastener member 4 may include a wing portion overlying the seat to engage the cross-pin and may be formed with suitable stop means to limit rotation of the stud such as is disclosed in the U. S. patent to Bedford No. 2,306,928, dated December 29, 1942. It will be understood that the fastener member 4 may be of any type and construction designed to be engaged by a rotary operative stud, and that the form illustrated in Fig. 10 is but one of many types adaptable to the present invention.

The stud member of the present invention comprises a pair of inter-threaded shank parts 10 and 11, the part 10 being suitably headed for engagement with the part 2 to be supported and the part 11 being formed with suitable fastener-engaging or locking means, for example a cross-pin 12 providing radially extending arms 13. Other forms of fastener-engaging and locking means may be employed without departing from the spirit of the invention.

Figure 1:
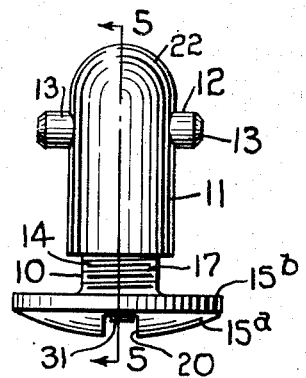
Fig. 1 is a side elevation of an adjustable fastener stud embodying the invention and employing one type of head portion.
Figure 2:
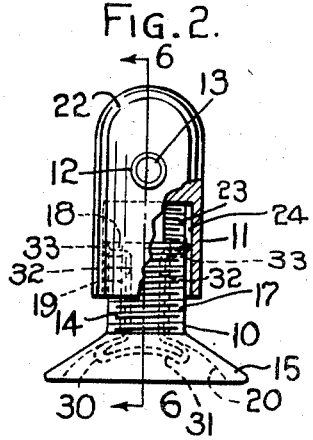
Fig. 2 is a front elevation of an adjustable fastener stud embodying the invention and illustrating a modified form of head portion.
Figure 3:
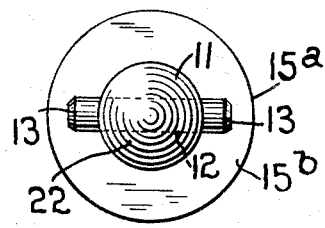
Fig. 3 is a plan view of the fastener stud shown in Fig. 1, as viewed from the nose end.
Figure 4:
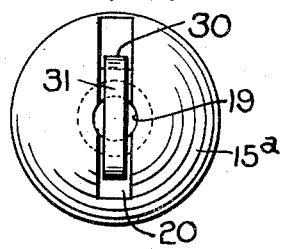
Fig. 4 is a plan view of the fastener stud shown in Fig. 1, as viewed from the head end.
Figure 5:
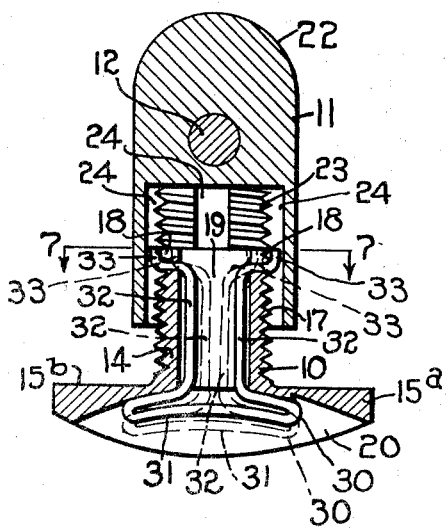
Fig. 5 is an enlarged vertical sectional view of a fastener stud as taken on the line 5—5 of Fig. 1.
Figure 6:
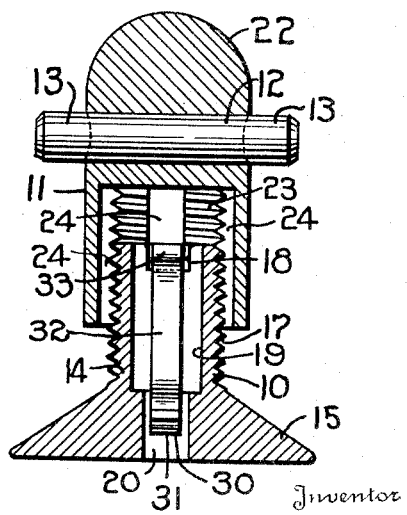
Fig. 6 is an enlarged vertical sectional view of a fastener stud as taken on the line 6—6 of Fig. 2.
Figure 7:
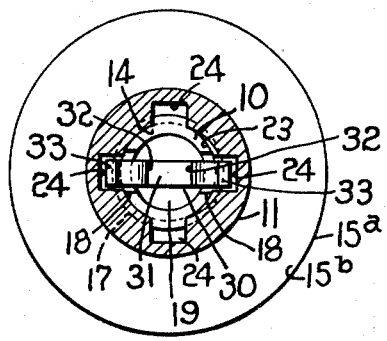
Fig. 7 is a horizontal sectional view as taken on the line 7—7 of Fig. 5.

The headed part 10 preferably comprises a shank portion 14 and a suitable head for bearing engagement with a surface of the part 2 to be supported. As illustrated in Figs. 2, 6 and 10, the head 15 is tapered to the shank 14 and is adapted to seat in a dimpled seat 16 in the part 2 (see Fig. 10), so that the outer end of the head may be flush with the outer surface of the part 2. Alternatively, the head 15a may be rounded or otherwise shaped and have a flat engaging surface 15b, as illustrated in Figs. 1 and 5.

The shank 14 of the headed part 10 is further formed with screw threads 17 for screw-threaded engagement with the fastener-engaging part 11. The screw threads may be of any desired pitch or number per inch, but preferably I employ the standard micrometer thread of 40 threads per inch.

The inner end of the shank 14 may be notched as at 18 to receive a locking member hereinafter described, and the shank 14 is centrally bored as at 19, which bore communicates with a transverse slot 20 to receive a suitable bladed tool by means of which the stud may be rotated.

The fastener-engaging part 11 of the stud may comprise a shank portion having a rounded nose 22 at one end and an internally threaded bore 23 at the other end adapted for threaded engagement with the threaded shank portion 14 of the headed part 10. The bore 23 preferably has lateral diametrically opposed slots 24 broached for the full depths of the threads to provide guides for the locking means later to be described. The nose end 22 of the part 11 is, in the illustrated form, provided with a transverse bore into which may be pressed the cross-pin 12 providing the radially extending fastener-engaging arms of the stud.

As will be apparent, the fastener-engaging part 11 of the stud is threaded upon the threaded shank 17 of the headed part 10 to thus form a complete stud, the effective length of which may be readily adjusted by simply relatively rotating the portions 10 and 11.

The invention provides novel means for normally locking the headed and fastener-engaging parts 10 and 11 against relative rotation, which means are housed within the stud but are accessible for unlocking when it is desired to effect adjustment and change the effective length of the stud.

The locking member 30 advantageously may comprise a spring member, preferably formed of a one-piece spring metal strip, having a head portion 31, resilient legs 32 and laterally extending locking fingers 33. The locking member 30 is assembled within the shank 14 of the part 10, with the legs 32 disposed in the bore 19, and is of such a length that the arms 33 are disposed in the notch 18 and the head 31 positioned within the slot 20 of the head 15 of the part 11. In their normal condition, the legs 32 are expanded or in spaced apart relation, as shown in Fig. 5, so that the ends of the arms 33 are seated in opposed slots 24. Inasmuch as either the legs 32 or the head 33, or both, are non-rotatably mounted in the headed part 10, engagement of the ends of the arms 33 in the slots 24 locks the parts 10 and 12 against relative rotation.

The locking spring 30 may be moved axially of the shank 14 by pulling upon the head end 31, tending to contract the legs 32 and withdraw the ends of the arms 33 from engagement with the slots 24, permitting relative rotation of the parts 10—11 a predetermined desired degree. Upon applying pressure to the head end 31 of the locking spring, the legs 32 and arms 33 are returned to their normal expanded locked position.

Thus, when a bladed tool is inserted in the slot 20 for rotation of the stud, it will press against the head end 33 of the locking member 30 and insure positive locked engagement between the parts 10 and 11.

Figure 8:
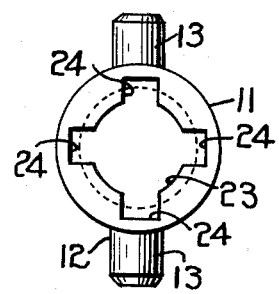
Fig. 8 is an end view of one end of the fastener-engaging portion of the stud shown in Fig. 5.
Figure 9:
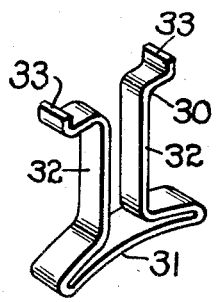
Fig. 9 is a detail perspective view of the locking member for the stud parts of the stud shown in Figs. 5 and 6.

When the screw threads on the shank portion 14 and bore 23 are cut to 40 threads per inch, one complete rotation of the part 11 on the headed part 10 will vary the effective length of the stud twenty-five thousandths of an inch (0.025 inch). When the relative rotation is only one-half turn, the effective length is adjusted 0.125 inch. A finer adjustment of .00625 inch may be obtained by providing four radial seats 18 in the end of the threaded shank portion 17, as shown in Fig. 8.

From the above it will be apparent that the invention provides an improved, simplified, yet strong adjustable stud fastener member, which is normally positively locked against accidental variations in adjustment, but which may be readily unlocked to permit easy variation in the effective length of the stud by definite increments or units of length.

Obviously the invention is not to be restricted to the precise construction shown in the drawings or to the specific thread pitch described, which is intended as illustrative only, as the scope of the invention is best defined in the appended claims.

I claim:

1. A fastener stud comprising a headed part provided with a threaded shank, said shank being formed with a central bore, a fastener-engaging part formed with a threaded bore rotatably mounted upon said threaded shank, a radially expansible locking member non-rotatably mounted in the threaded shank, and having a portion extending into the central bore of the headed part including resilient portions normally expanding the locking member into locking engagement with the fastener-engaging part, said locking member being accessible through the central bore of the headed part for disengagement with the fastener-engaging part.

2. A fastener stud comprising a headed part provided with a threaded shank formed with diametrically opposed locking seats, a fastener-engaging part provided with radially extending arms and formed with a threaded bore adapted to be engaged upon the threaded shank of the headed part, a transverse locking member non-rotatable but axially movable in the bore of said headed part including opposed laterally extending portions connected by a resilient spring portion for normally urging said laterally extending portions into positive locking engagement with said seats, one of said parts provided with a bore from an outer surface providing access to said locking member permitting unlocking of the member from said seats and relative rotation of said headed and fastener-engaging parts.

3. A fastener stud comprising a headed part provided with a threaded shank, said shank being formed with a central bore extending longitudinally thereof and opening at both ends, a fastener-engaging part formed with a threaded bore rotatably mounted upon said threaded shank, a locking member mounted in the central bore of the headed part and having a laterally extending finger and a resilient radially expansible portion for normally urging said finger into locking engagement with the shank of the headed part and with the bore of said fastener-engaging part, said locking member having a portion accessible through the opening of said central bore at the headed end of said headed part to provide for the disengagement of said finger from the bore of said fastener-engaging part.

4. A fastener stud comprising a headed part provided with a threaded shank, said shank being formed with a diametrically opposed locking seats at the end opposite the head and a central bore extending longitudinally thereof and opening at both ends, a fastener-engaging part formed with a threaded bore rotatably mounted upon said threaded shank and having diametrically opposed grooves extending longitudinally along said threaded bore, a transversely extending radially expansible locking member non-rotatably mounted in the fastener-engaging part and having opposed laterally extending fingers connected by a resilient integral portion extending into the central bore of the headed part, said resilient integral portion normally urging said fingers into locking engagement with the locking seats of said headed part and with the grooves of said fastener-engaging part, and said resilient integral portion having a portion disposed in said central bore adjacent the headed end of said headed part and accessible through the opening in said headed end to provide for the disengagement of said fingers from said locking seats and said grooves.

THEODORE R. GRIFFIN.

REFERENCES CITED

The following references are of record in the file of this patent:

UNITED STATES PATENTS

| Number | Name | Date |
|---|---|---|
| 267,269 | Smith | Nov. 7, 1882 |
| 1,206,410 | Butler | Nov. 28, 1916 |
| 1,208,539 | Gilbert | Dec. 12, 1916 |
| 2,364,906 | Lumsden | Dec. 12, 1944 |
| 2,422,289 | Churchill | June 17, 1947 |
| 2,425,636 | Parkin | Aug. 12, 1947 |

FOREIGN PATENTS

| Number | Country | Date |
|---|---|---|
| 191,817 | Great Britain | Jan. 27, 1923 |
| 573,227 | Great Britain | of 1945 |